United States Patent [19]

Nmngani

[11] Patent Number: 5,541,621

[45] Date of Patent: Jul. 30, 1996

[54] MOUSE OR TRACKBALL SYSTEM

[76] Inventor: Abdulatif M. T. Nmngani, P.O. Box 13925, Jeddah, Saudi Arabia, 21414

[21] Appl. No.: 489,625

[22] Filed: Jun. 12, 1995

[51] Int. Cl.⁶ ........................................... G09G 5/08
[52] U.S. Cl. ............................... 345/167; 345/164
[58] Field of Search ........................ 345/163, 164, 345/165, 166, 167, 161, 157, 156, 158; 178/18, 19, 20; 74/471 XY; 273/148 B, 438; 200/6 A

[56] References Cited

U.S. PATENT DOCUMENTS

| | | |
|---|---|---|
| 3,613,090 | 10/1971 | Mason . |
| 3,835,464 | 9/1974 | Rider . |
| 4,754,268 | 6/1988 | Mori . |
| 4,786,892 | 11/1988 | Kubo et al. . |
| 4,818,978 | 4/1989 | Kurihara et al. . |
| 4,961,138 | 10/1990 | Gorniak . |
| 5,029,292 | 7/1991 | Zajicek . |
| 5,078,019 | 1/1992 | Aoki . |
| 5,115,227 | 5/1992 | Keiji . |
| 5,168,221 | 12/1992 | Houston . |
| 5,237,311 | 8/1993 | Mailey et al. . |
| 5,248,961 | 9/1993 | Fujii . |
| 5,252,970 | 10/1993 | Baronowsky . |
| 5,287,090 | 2/1994 | Grant . |
| 5,298,919 | 3/1994 | Chang . |
| 5,379,053 | 1/1995 | Steinberg . |

*Primary Examiner*—Richard Hjerpe
*Assistant Examiner*—Regina Liang
*Attorney, Agent, or Firm*—Myers, Liniak & Berenato

[57] ABSTRACT

A position indicating mouse or trackball device is provided which includes first and second sensors for detecting rotation of the ball, the first and second sensors being arranged orthogonal to one another and mounted inside of the rotatable ball. In certain embodiments, the rotatable ball includes an inner ball positioned inside of an outer ball wherein the outer ball is rotatable relative to the inner ball and cursor position indicating data is transmitted to a display system by way of a wireless (e.g. RF) transmitter positioned inside of the rotatable ball.

12 Claims, 9 Drawing Sheets

MOUSE OR TRACKBALL SYSTEM

This invention relates to an X-Y direction input device, the most suitable application of which is expected in a graphic display apparatus. More particularly, this invention relates to either a "trackball" or "mouse" system including an improved ball therefor.

BACKGROUND OF THE INVENTION

Graphic display devices generally include a display screen, a display controller, data channels, and an input device(s). There are many types of input devices, some of which are X-Y or X-Y-Z direction input devices, commonly known in the art as "mouse" or "trackball" systems, configured to detect the moving direction and distance of a coordinate indicating ball within a casing.

With respect to "mouse" systems, these X-Y directional input systems generally include a rotatably supported ball made of steel or rubber, a first sensor roller contacting and rotated by the ball, a second sensor roller contacting and rotated by the ball, the second sensor having an orientation perpendicular to the orientation of the first roller. Also included in typical "mouse" systems are first and second rotation detectors connected via shafts to the first and second sensor rollers. Each rotation detector includes a rotary electrical member, such as a variable resistor or an encoder. These detectors independently detect rotation of the abovementioned first and second sensor rollers which are caused to rotate by movement of the ball.

Typically, "mouse" X-Y or X-Y-Z direction input devices include push switches or buttons, located inside of or along the outside of the casing, to effect deletion or dislocation of patterns or figures displayed on the screen or to enable signal processing for other switching and control operations when activated.

Mouse casings typically include an aperture defined in the bottom thereof so as to allow the ball to project slightly downward. When the casing is moved along a generally flat surface or platform, the ball necessarily rotates on the surface with the first and second sensor rollers being rotated in predetermined different (X or Y) directions respectively. The amounts of rotation of the first and second rollers are independently extracted by the corresponding first and second detectors. The detectors output corresponding voltages or digital signals indicative of the detected X and Y directional components, which are eventually sent to the display apparatus.

Figure 1A:
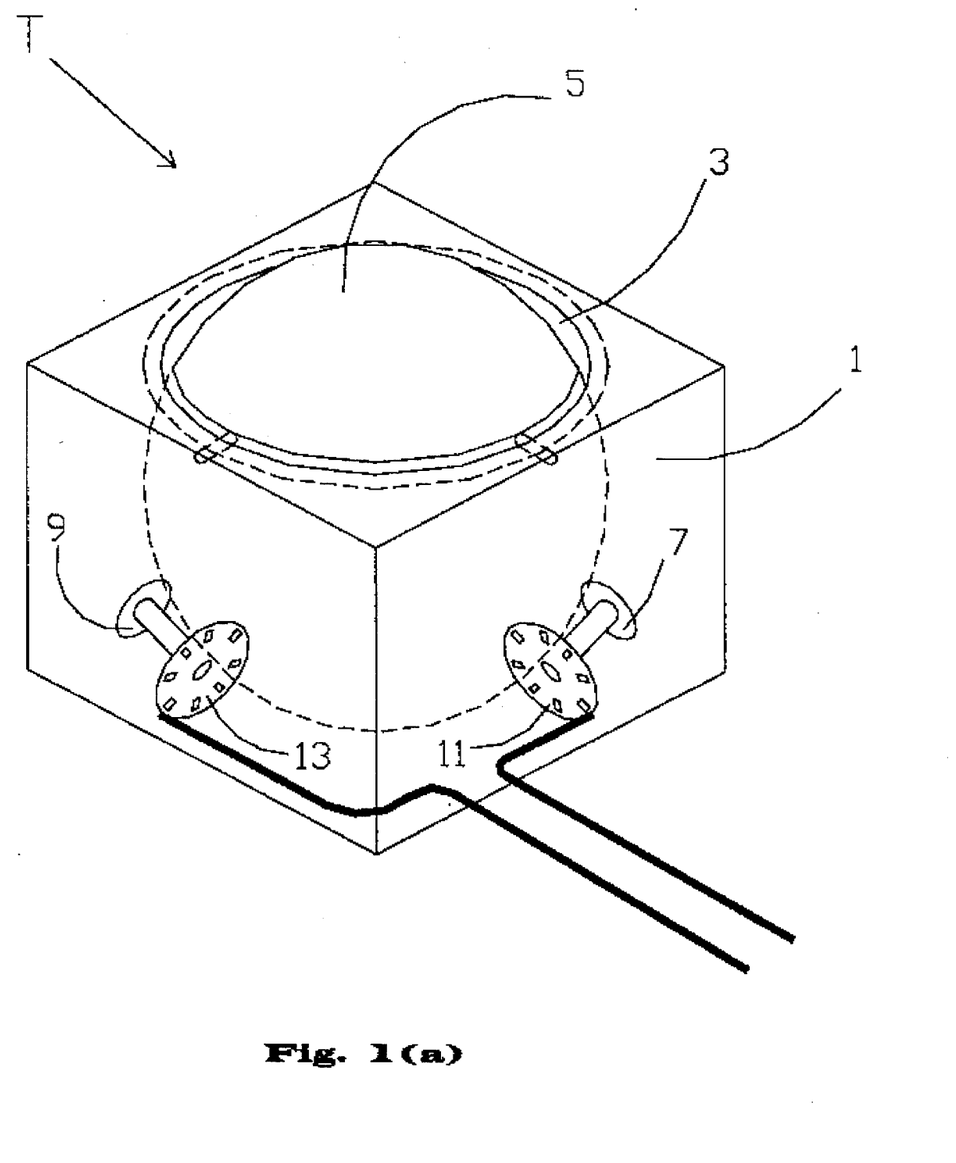
FIG. 1(a) is a perspective view of a prior art "trackball" device.

With respect to conventional "trackball" devices, such a device is illustrated in prior art FIG. 1(a). "Trackball" devices, such as the one illustrated in FIG. 1(a), perform functions similar to those of the conventional mouse devices described above. In other words, "trackball" devices are also X-Y or X-Y Z coordinate input systems for moving a cursor or the like on a display screen to a desired coordinate point on the screen. Alternatively, they may be used to select desired menu items appearing on the display by way of moving the cursor and activating button(s). Typically, "trackball" devices respond to manual rotation of a ball partly projecting from the upper wall of the casing, with the amount of ball rotation determining the cursor movement.

As shown in prior art FIG. 1(a), typical "trackball" device T includes housing 1 serving as an outer shell provided with circular opening 3 formed in the top wall thereof. Rotatable ball 5 mounted in housing 1 partially projects outwardly through circular opening 3 above the top wall. A pair of sensor rollers or rotatable members 7 and 9 are arranged substantially orthogonal to one another and are rotatable in accordance with rotation of ball 5. Detectors 11 and 13 are connected to rollers 7 and 9 respectively via shafts so as to make up orthogonally oriented rotation sensors. Detectors 11 and 13 are, for example, encoders capable of detecting the amount of rotation of rollers 7 and 9, respectively.

In operation, the user of "trackball" T rotates ball 5 within casing 1. The X-axis component and the Y-axis component of ball rotation are transmitted to the X and Y sensor rotating members 7 and 9 respectively, these components having substantially perpendicular directional vectors. The amount of rotation of rollers 7 and 9 is detected by detectors 11 and 13 respectively, which in turn produce signals in accordance with which a cursor is moved on a display screen (not shown) of a display device to which the "trackball" device is in electrical communication. When the cursor has been moved to a desired coordinate position or to a position of a desired menu item on the display, the user stops rotation of ball 5 and turns or presses an input button switch(es) (not shown), thereby inputting the coordinate value or selecting the menu item.

In the increasingly miniaturized world of computer technology, it is desirable to utilize as little space as possible when designing computer related equipment, including coordinate input devices. Unfortunately, prior art "mouse" and "trackball" devices are rather bulky and take up large amounts of space due to their many components disposed between the ball and the casing exterior.

U.S. Pat. No. 5,379,053 discloses a cursor control device for a computer display. The controller includes a solid member surrounded by a flexible bladder, both being received within a housing. The bladder is freely movable relative to the solid so that its movement is sensed by X and Y transducers to generate signals which may be employed to control the visual display of a computer. The device may be physically connected to the computer or alternatively use a wireless transmitter to broadcast signals to a receiver associated with a computer. Unfortunately, the design of this prior art suffers from at least the following problems. Firstly, the controller is ergonomically undesirable. Secondly, the shape of the solid inner member in corresponding flexible bladder are problematic in that the presence of rather sharp corners is thought to lead to premature wearing of the controller as well as inefficient coordinate input data. Furthermore, the flexibility of the outer bladder of U.S. Pat. No. 5,379,053 may lead to undesirable friction between the two members during movement of them relative to one another.

It is apparent from the above that there exists a need in the art for a "trackball" or "mouse" device which is reduced in size with respect to prior art devices, includes a lesser number of moving parts disposed outside of the ball within the casing, and is not prone to premature wearing or inefficient coordinate input.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a coordinate input apparatus for a display system where the display is alterable in accordance with signals delivered to the display from the coordinate input apparatus, the signals indicating coordinate positions on the display, the coordinate input apparatus comprising:

a housing;

a hollow ball rotatably mounted in the housing;

an inner structure disposed within the ball, the inner structure including a ring-shaped member rotatable relative to the ball in a predetermined direction;

a first sensor for detecting ball rotation in the predetermined direction, the first sensor being located inside of the ball; and a second sensor affixed to the ring-shaped member for detecting ball movement in the direction substantially perpendicular to the predetermined direction.

This invention further fulfills the above-described needs in the art by providing a coordinate indicating device including a rotatable ball mounted within a housing where rotation of the ball causes coordinate indicating data to be transmitted to a display, the rotatable ball comprising:

an inner ball and an outer ball, the inner ball located inside of the outer ball, the outer ball being rotatable relative to the inner ball so as to permit coordinate indicating data detected by a first sensor mounted inside of the outer ball to be transmitted to the display.

DETAILED DESCRIPTION OF CERTAIN EMBODIMENTS OF THIS INVENTION

Referring now more particularly to the accompanying drawings in which like reference numerals indicate like parts throughout the several views.

Figure 1B:
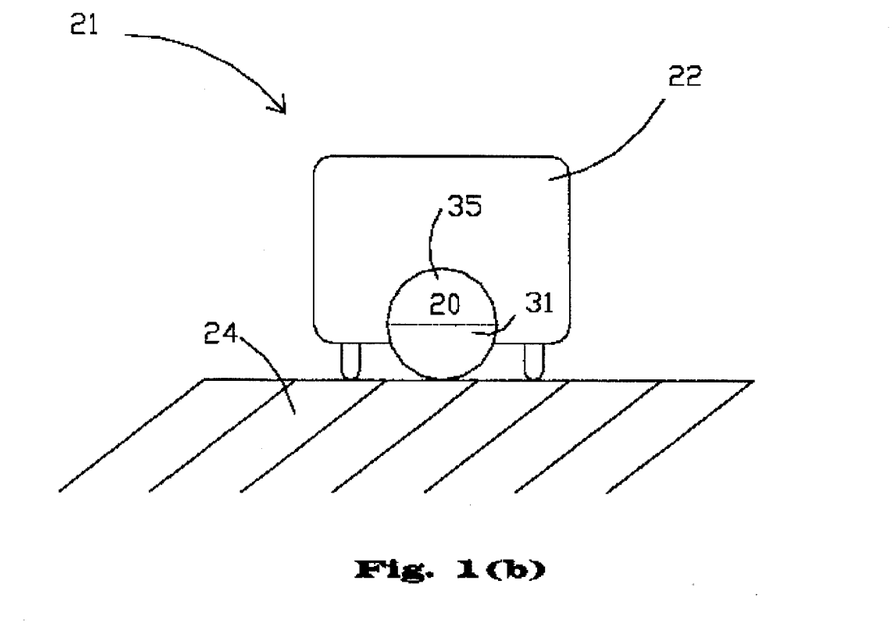
FIG. 1(b) is a side elevational view of a "mouse" device including a ball according to the first embodiment of this invention.

The first embodiment of this invention is illustrated in FIGS. 1(b)–6. FIG. 1(b) illustrates a "mouse" device 21 including ball 20 according to the first embodiment of this invention, while FIG. 1(c) illustrates a "trackball" device 26 including ball 20 also in accordance with the first embodiment. Ball 20 is useable in both the "mouse" and "trackball" devices illustrated in FIGS. 1(b)–1(c), respectively.

FIG. 1(b) illustrates "mouse" device 21 including rotatable ball 20 and housing 22, which together make up a handpiece or "mouse" to be grasped by a user and moved about or along work surface 24 on which "mouse" 21 rests so as to rotate ball 20 within housing 22. "Mouse" 21 is in communication with a host computer (not shown) via either a cord (not shown) or a wireless communicator, such as an RF transmitter/receiver. Ball 20 may be made of rubber or any other suitable material.

In mouse 21, rotatable ball 20 represents a coordinate locating or indicating member which provides user input of two-dimensional data, such as movement of a cursor in a single plane of a display screen, in the form of two translational orthogonally aligned coordinates X and Y.

Figure 1C:
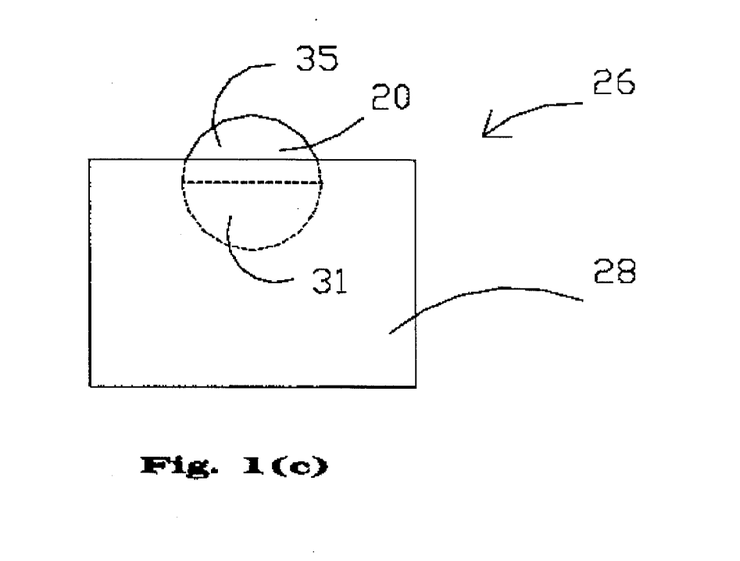
FIG. 1(c) is a side elevational view of a trackball device including a ball according to the first embodiment of this invention.

FIG. 1(c) illustrates "trackball" device 26 including ball 20. "Trackball" 26 defines rotatable ball 20 mounted within stationary housing 28. As with conventional trackballs, trackball 26 inputs X-Y coordinate data to a computer or display screen by way of user manipulation (i.e. rotating) of ball 20 in desired directions. Housing 28 remains stationary while the user rolls or manipulates ball 20 so as to, for example, move a cursor on a computer display screen in a conventional manner. Trackball 26 is, of course, in communication with a host computer (not shown) by way of a cord or cable (not shown) or a wireless transmitter in a manner such that coordinate indicating data may be sent from trackball device 26 to the display screen.

Figure 2:
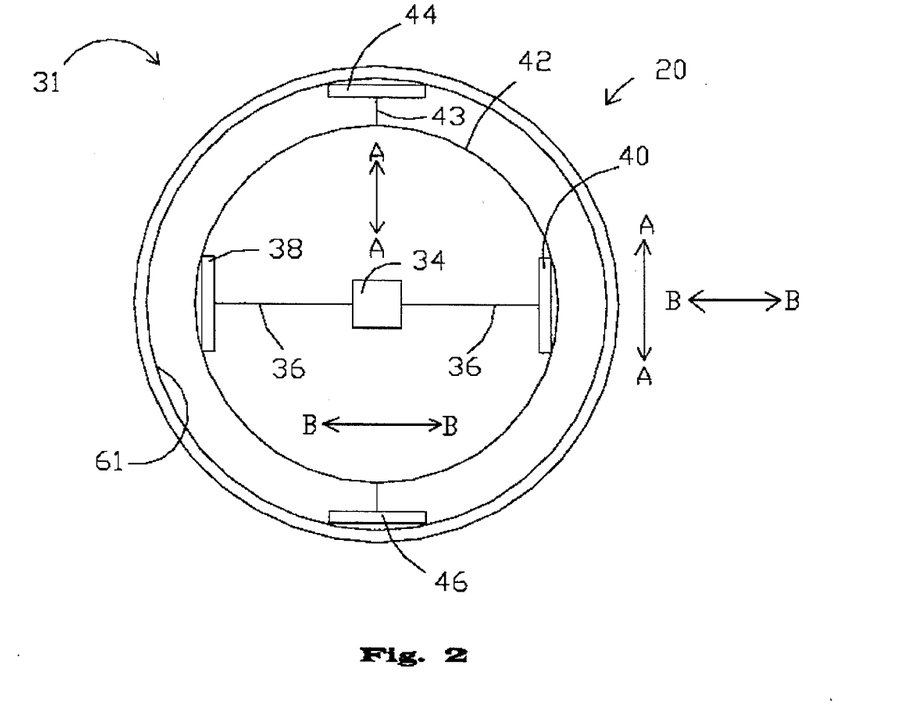
FIG. 2 is a top plan view illustrating the lower gravitational half of a "mouse" or "trackball" ball according to the first embodiment of this invention.
Figure 3:
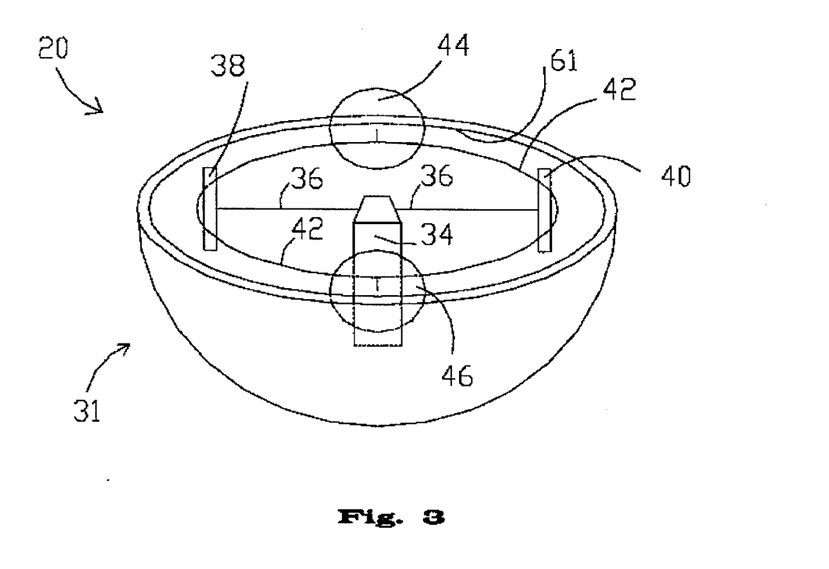
FIG. 3 is a perspective view illustrating the lower gravitational half of the ball according to the FIG. 2 or first embodiment of this invention.
Figure 4:
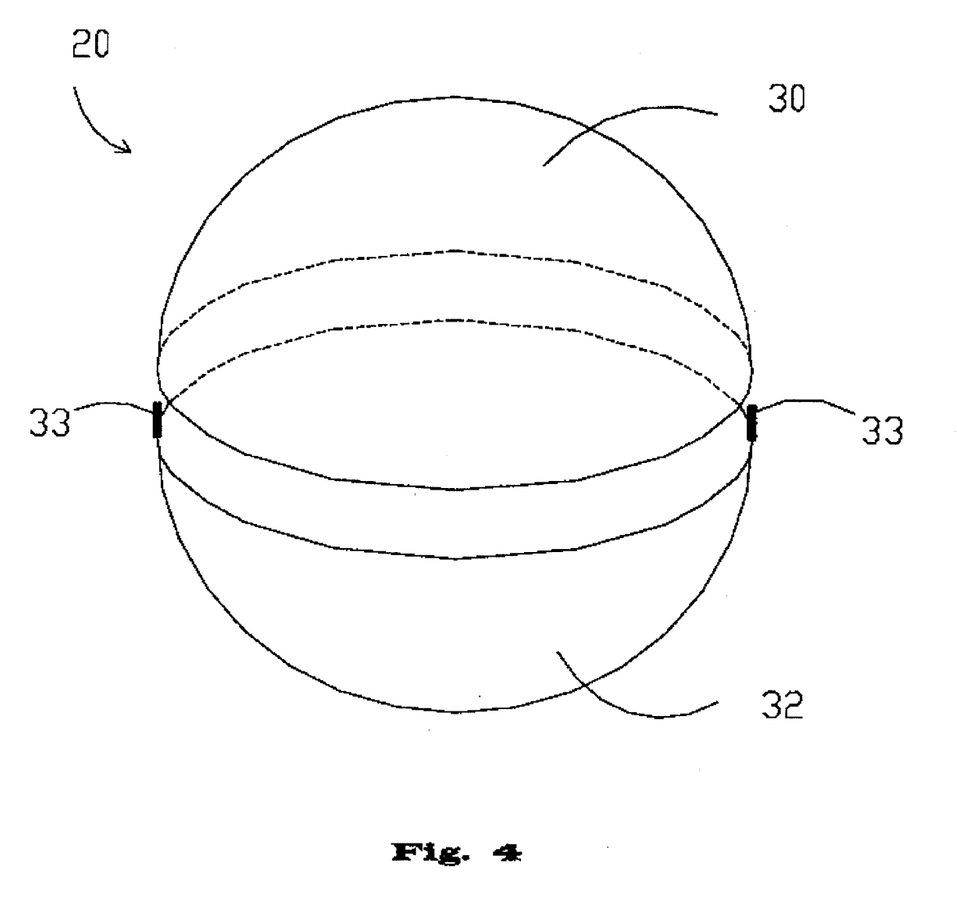
FIG. 4 is a perspective view illustrating first and second structural halves of the ball according to the first embodiment of this invention.

FIGS. 2–4 and 6 illustrate different features of ball 20, with FIGS. 2 and 3 illustrating lower gravitational half 31 of ball 20 in a given position. FIG. 4 shows detachably connected first and second structural halves 30 and 32 of ball 20. Structural halves 30 and 32 are detachably connected so that the below described elements can be inserted into and taken out of ball 20. Upper and lower gravitational halves 35 and 31 respectively referred to herein, lower half 31 best shown in FIGS. 2 and 3, are defined by the orientation of ball 20 with respect to gravity.

First structural half 30 and second structural half 32 of ball 20 may be connected by way of a magnet(s), clips, screws, adhesive, or any other suitable means 33, as best shown in FIG. 4, so that the halves may be disconnected from one another when desired, thereby allowing access to the interior of ball 20. Additionally, first and second structural halves 30 and 32 have substantially equal weights in order to provide a substantially balanced ball 20.

FIG. 2 is a top elevational view looking down upon lower gravitational half 31 of ball 20, while FIG. 3 is a perspective view of lower gravitational half 31 of ball 20. Battery compartment 34, which houses a battery (not shown) or other power source, is always mounted within lower gravitational half 31 of ball 20 no matter what the position of halves 30 and 32.

Battery compartment 34 is affixed to or mounted on bar 36 disposed within the lower gravitational half 31 or alternatively at the equator of ball 20. Bar 36 and compartment 34 are rotatably mounted relative to the center of sensor 38 so that when sensor 38 rotates along with ring 42 relative to bar 36, the amount of rotation is detected by sensor 38. Due to the rotatable mounting of compartment 34 and bar 36 relative to sensor 38 and conductor 40, compartment 34 typically "stands up" or is mounted transversely with respect to the ground plane no matter what direction the ball is rotated. In other words, the force of gravity in combination with the pivotal mounting of compartment 34 and bar 36 continually causes compartment 34 to extend perpendicularly with respect to surface 24, no matter what direction or orientation ball 20 assumes. Thus, compartment 34 is always disposed within "the lower gravitational half" of ball 20, no matter what direction or orientation ball 20 assumes.

Sensor 38 and conductor 40 are affixed to ring member 42. Ring 42 is made up of a circular bar and rotates along with the ball relative to bar 36 and compartment 34, but only when ball 20 is moved in the A direction illustrated in FIG. 2. Therefore, sensor 38 detects A direction movement of the ball because when the ball is moved in this direction, disc-shaped sensor 38 rotates relative to bar 36.

Ball 20 rotation direction B is perpendicular to direction A. Disc-shaped sensor 44, which is affixed to ball inner surface 61, detects ball movement in the B direction. Because ring 42 does not rotate with the ball in the B direction and sensor 44 does, sensor 44 detects the amount of B direction ball movement by measuring its rotation relative to shaft 43 which extends outwardly from ring 42. Shaft 43 is affixed to ring 42.

Thus, rotatable disc-shaped sensors 38 and 44 detect the amount of rotation of ball 20 in the A and B directions respectively and output the corresponding data to the display system. Wire(s) (not shown) extend from the sensors so as to allow the sensors to forward their detected ball rotation to controller 50 (see FIG. 5) also disposed within ball 20.

Conductor 40 mounted on ring 42 passes current from the battery within compartment 34 to other units requiring power within ball 20, such as to controller 50 and additional sensor(s). Wires (not shown) are disposed along bar 36 between conductor 40 and battery compartment 34 to allow the power from the battery to make its way to conductor 40 (and to other conductors if provided) and beyond.

No matter how ball 20 is rotated, the power and sensor elements (e.g. 36, 42, 40, 38, 34, etc.) illustrated in FIGS. 2 and 3 remain in lower gravitational half 31 of ball 20 or at the equator thereof. Thus, if during rotation of ball 20, first and second structural halves 32 and 30 become shifted so that first structural half 30 is closest to surface 24, then the power and sensor elements illustrated in FIGS. 2 and 3 become disposed within first structural half 30. Furthermore, it will be appreciated that elements 36, 34, 42, 38, 40, and 42 are usually disposed partly in structural half 30 and partly in structural half 32 due to the low probability that ball 20 will be precisely oriented in a manner such that a particular structural half is representative of lower gravitational half 31.

Non-movably affixed to ball surface 61 are sensor 44 and electrical conductor 46 so that the ball including interior surface 61 can rotate relative to ring 42 when the ball is moved in the B direction. Conductor 46 may be, for example, a conventional five level conductor while conductor 40 may be a conventional two level conductor. These conductors function to direct electrical current and signals to and from the requiring elements within ball 20 and permit rotation of the ball relative to ring 42 in the B direction.

Sensors 38 and 44 output in a conventional manner data indicating the direction and amount of rotation of ball 20. The perpendicular arrangement of sensors 38 and 44, which is conventional in the art, allows each sensor to output different coordinate data. In other words, sensor 38 may output X (i.e. A) coordinate data, while sensor 44 outputs Y (i.e. B) coordinate data. Exemplary ball rotation sensors may be found in U.S. Pat. Nos. 5,298,919; 5,078,019; and 4,786,829, the disclosures of which are hereby incorporated herein by reference.

Figure 5A:
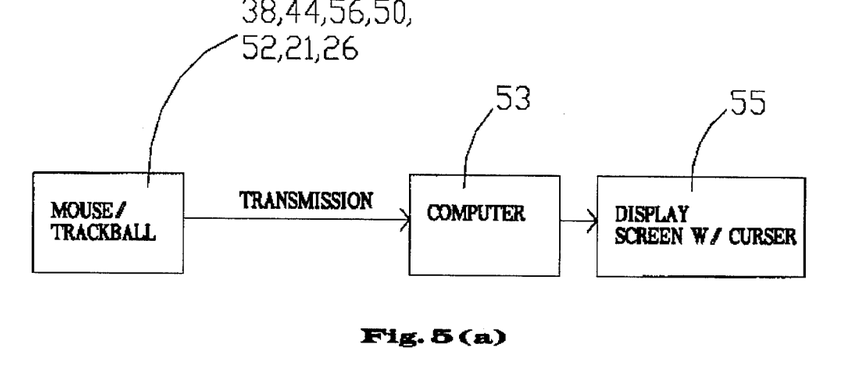
FIG. 5(a) is a block diagram of the mouse/trackball and the computer and display system with which the mouse is in communication.

FIG. 5(a) is a block diagram illustrating mouse/trackball 21/26 and its communication with computer 53 and display screen 55 including a cursor. The mouse/trackball including ball 20 transmits coordinate data to computer 53 including interface card 54 which in turn instructs display 55 as to cursor movement.

Figure 5B:
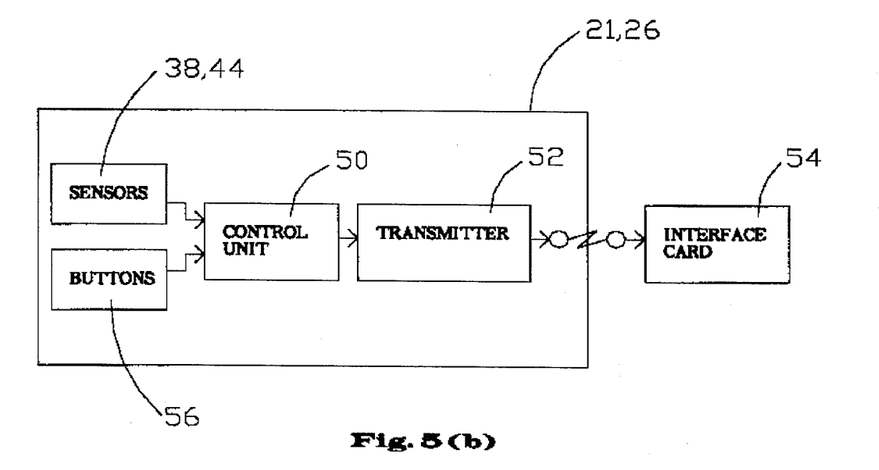
FIG. 5(b) is block diagram of the components making up the "mouse" or "trackball" system according to the first embodiment of this invention.

FIG. 5(b) is a block diagram of the components according to at least the first, second, third, and fourth embodiments of this invention. Illustrated in FIG. 5 are sensors 38, 44, control unit 50, transmitter 52, interface card 54, and buttons 56. Sensors 38 and 44 sense the rotational movement of ball 20 and output coordinate indicative data to control unit 50 as discussed above. Control unit 50 analyzes the data input from sensors 38, 44 and buttons 56 in a conventional manner, and outputs resulting signal data to wireless transmitter 52. Transmitter 52 is also disposed within ball 20, and components thereof are illustrated in FIG. 6. Button(s) 56 may be located either in the outer housing of the mouse or trackball device 21 or 26 respectively as is conventional in the art, or alternatively may be located on or inside of ball 20.

Figure 6:
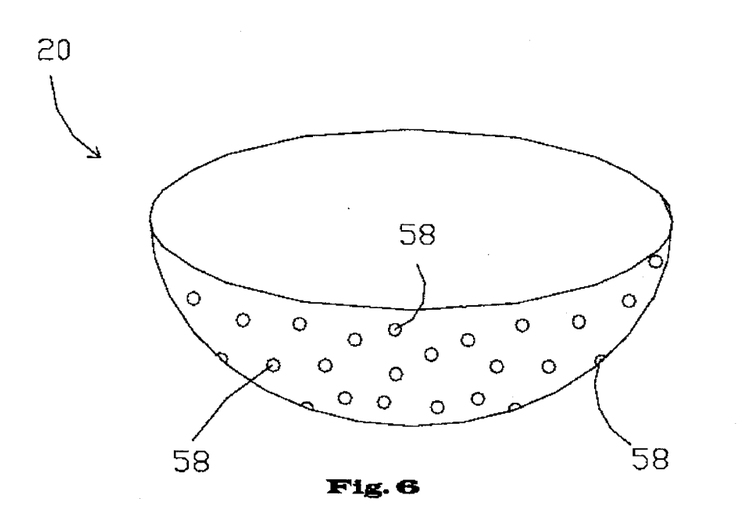
FIG. 6 is a perspective view of the first or second structural half of the ball according to the first embodiment of this invention, including wireless transmitting or emitting elements.

Transmitter 52 is a wireless modem that transmits data through atmospheric free space and does not require external cable(s) or cord(s). For example, transmitter 52 disposed within ball 20 may be a conventional radio frequency (RF) transmitter. The data transmitted via transmitter 52 from within ball 20 is sent to an RF receiver connected to interface card 54 disposed within computer 53 or corresponding display system to which the coordinate data from sensors 38 and 44 is being sent. Emitters 58 within ball 20 provide antenna portions for transmitter 52. Alternatively, a single RF emitter may be disposed along with transmitter 52 inside of compartment 34. Interface card 54 within computer 53 then forwards instructional coordinate data to display 55 in a known manner so that the cursor moves in accordance with the mouse 21 or trackball 26.

Figure 7:
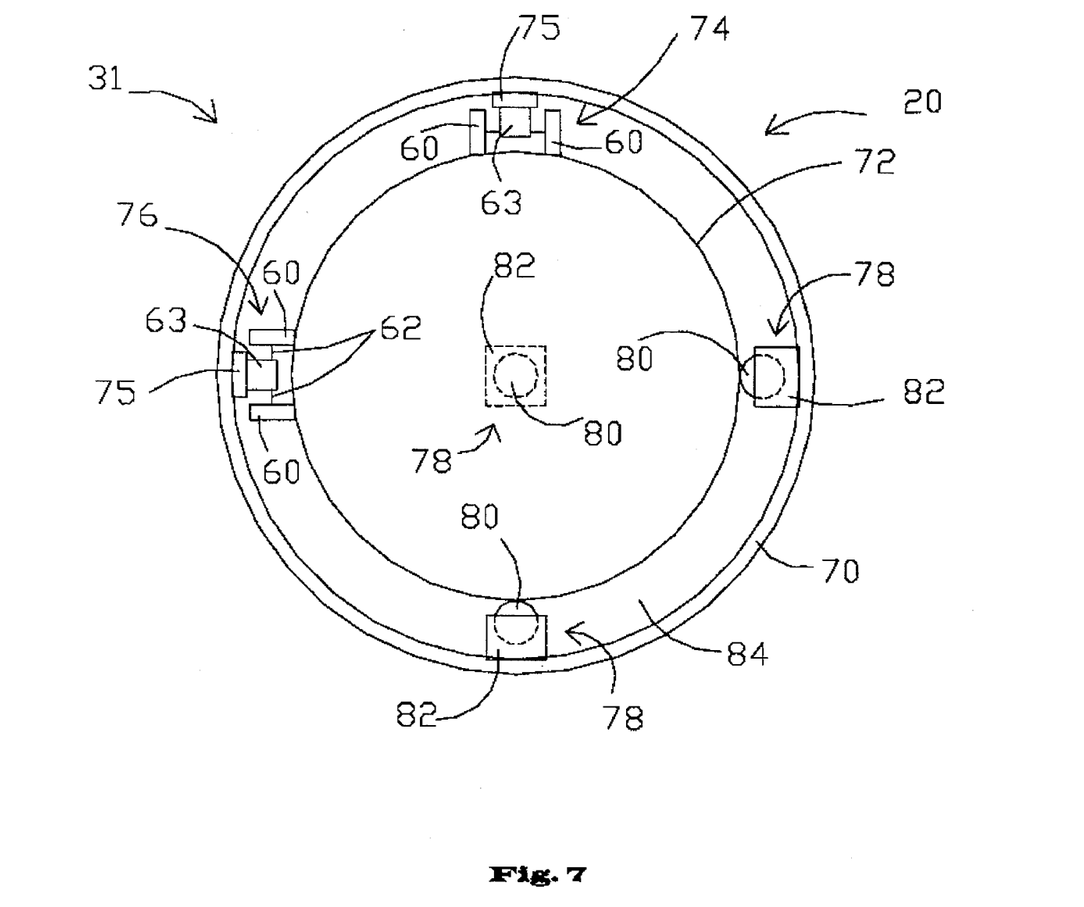
FIG. 7 is a top plan view of the lower gravitational half of a ball according to a second embodiment of this invention wherein the ball includes both an inner ball and an outer ball.

FIG. 7 is a top view of the lower gravitational half 31 of ball 20 according to a second embodiment of this invention. In this embodiment, ball 20 includes outer ball 70 and inner ball 72, with the inner diameter of outer ball 70 being larger than the outer diameter of inner ball 72. Conventional ball rotation sensors 74 and 76 are disposed in annular space 84 defined between inner ball 72 and outer ball 70. Disc members 63 of sensors 74 and 76 are similar to disc-shaped sensors 38 and 44 described above in that they detect the amount of rotation of ball 70 with respect to ball 72 in predetermined orthogonal directions. Roller members 60 of sensors 74 and 76 are oriented substantially orthogonal to one another so that, for example, sensor 74 detects the amount of rotation of outer ball 70 relative to inner ball 72 in the X direction and sensor 76 detects the amount of rotation in the Y direction. One or two rollers 60 may be provided for each sensor 74 and 76, with each roller(s) 60 being rotatingly connected to disc encoder 63 via a shaft(s) 62 so that disc-shaped sensors 63 can detect the amount of rotation of rollers 60 via shafts 62.

As illustrated in FIG. 7, sensors 74 and 76 are fixedly mounted on the interior periphery of outer ball 70 via mounting members 75. As outer ball 70 rotates with respect to inner ball 72 (which stays relatively stationary), sensors 74 and 76 detect rotational movement in their respective orthogonal directions and, in turn, forward coordinate indicating data to control unit 50 and transmitter 52 disposed within ball 20. Thus, sensors 74 and 76 function in a conventional manner.

Also disposed within annular gap or space 84 between the interior periphery of outer ball 70 and the outer periphery of inner ball 72 are bearing members 78. Each bearing member 78 includes a ball bearing 80 and a corresponding support housing 82 in which the ball bearing is mounted. Housings 82 are affixed to the inner periphery of outer ball 70, with balls 80 contacting and supporting inner ball 72. Thus, bearings 78 reduce or keep relatively low the coefficient of friction between inner ball 72 and outer ball 70. The centers of balls 72 and 70 remain aligned with one another during rotation of outer ball 70 relative to inner ball 72. Thus, bearings 78 function to maintain gap or space 84 substantially constant throughout rotation of ball 20, and to keep relatively low the coefficient of friction between balls 70 and 72 in order to allow substantially free rotation of outer ball 70 relative to inner ball 72.

Figure 8:
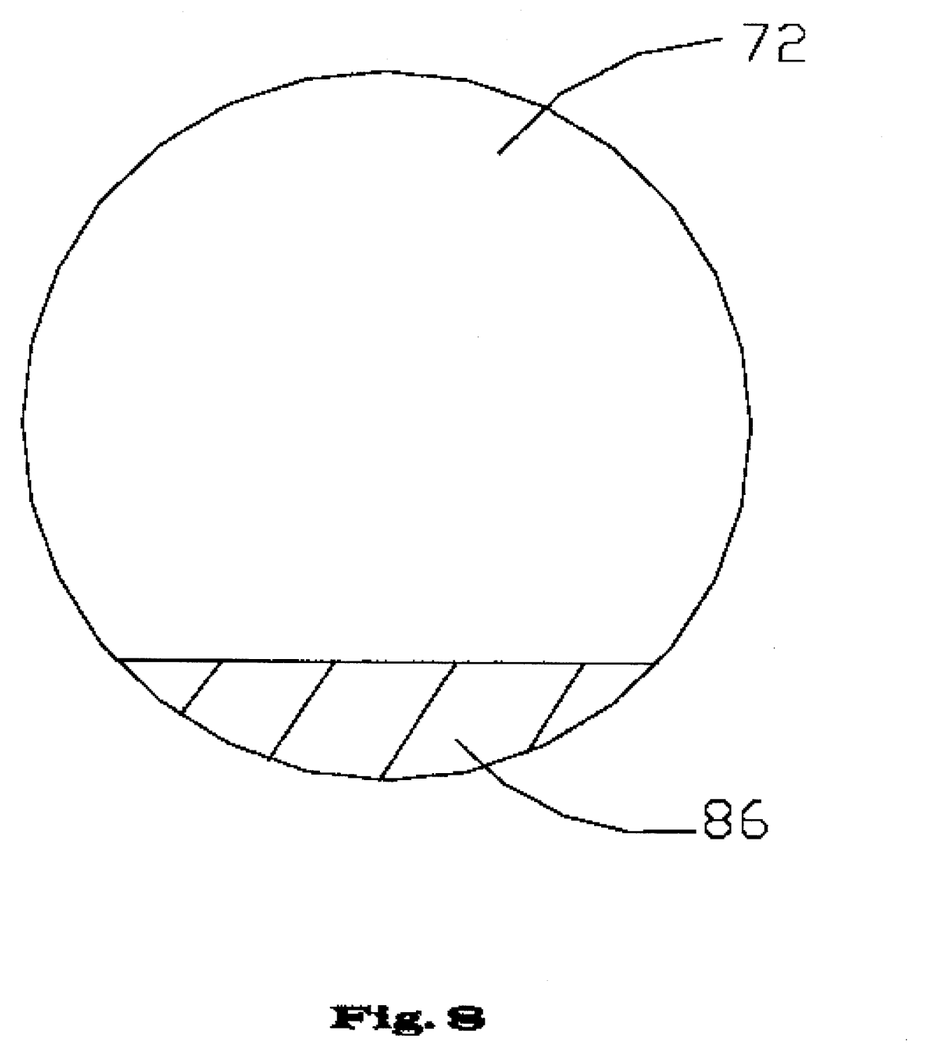
FIG. 8 is an elevational view partially in cross-section of the inner ball according to the FIG. 7 or second embodiment of this invention.

Inner ball 72 according to this second embodiment includes weight 86 (see FIG. 8) disposed in its lower gravitational portion, so as to cause inner ball 72 to remain in a substantially unchanged position with respect to gravity no matter how outer ball 70 is oriented or rotated. In other words, weight 86 within inner ball 72 keeps inner ball 72 substantially stationary relative to surface 24 while outer ball 70 rotates with respect thereto. Thus, when a user manipulates a mouse or trackball device including ball 20 according to the second embodiment of this invention, outer ball 70 rotates while inner ball 72 remains substantially stationary. Sensors 74 and 76 detect the amount of rotation of outer ball 70 relative to inner ball 72 in predetermined substantially orthogonal directions and forward the coordinate indicating data to controller 50, the data, of course, eventually reaching a display system in order to control movement of the cursor thereof.

Figure 9:
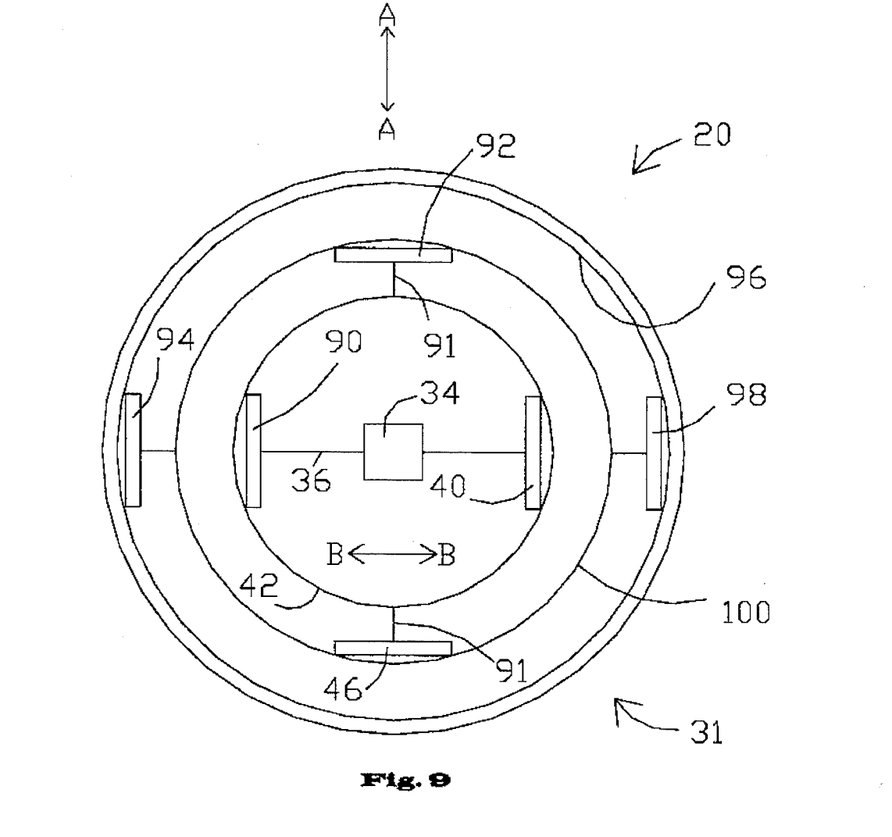
FIG. 9 is a top plan view of the lower gravitational half of a ball according to the third embodiment of this invention wherein a pair of ring members are disposed within a single ball.
Figure 10:
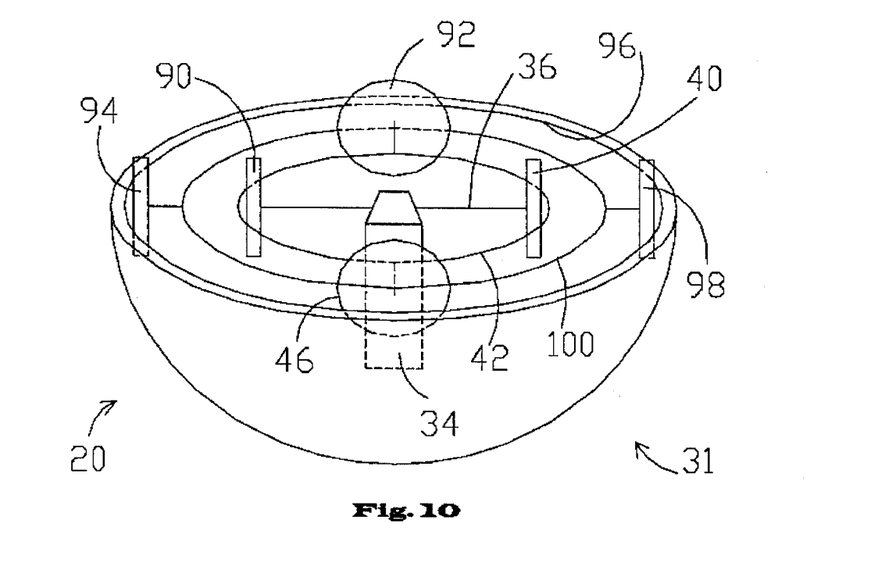
FIG. 10 is a perspective view of the lower gravitational half of the ball according to the FIG. 9 or third embodiment of this invention.
Figure 11:
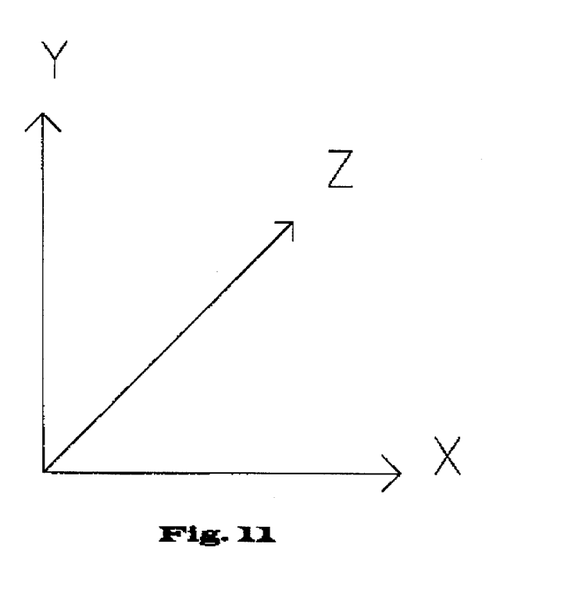
FIG. 11 illustrates exemplar X-Y-Z directions relative to one another according to certain embodiments of this invention.

FIGS. 9–11 illustrate ball 20 according to a third embodiment of this invention. According to the third embodiment, ball 20 includes a single ball portion including first and second structural halves 30 and 32 similar to those of the first embodiment. FIGS. 9 and 10 illustrate lower gravitational half 31 of ball 20 according to the third embodiment.

A difference between the first and third embodiments is that in the third embodiment three ball rotation sensors 90, 92, and 94 are provided for three degrees of freedom instead of the two of the first embodiment. As illustrated in FIGS. 9–10, ball rotation sensors 90, 92, and 94 are provided inside of ball 20. These sensors function in a manner similar to sensors 38, 44, and 63 of the previous embodiments. As is conventional in the art, sensors 90, 92, and 94 are oriented in substantially different directions so as to detect rotational movement of ball 20 in two directions, as the first embodiment.

As best shown in FIGS. 9–10, battery compartment 34 is mounted on bar 36. Sensor 90 and 94 which is fixedly mounted on ring 42, and the ball surface 96 detects A direction ball movement as ring 42 and sensor 90 rotate relative to bar 36 and as the ball and sensor 94 rotates relative to the ring 100. Both outputs of these two sensors 90 and 94 are transferred to the control unit as an indication of the ball movement in the A direction. Additionally, ring 100 is provided to allow sensor 92 and conductor 46 to be mounted thereon within ball 20. Rings 42 and 100 are substantially similar, both being made up of circular bars with ring 100 having a larger diameter than that of ring 42. Sensor 92, which is mounted on ring 100, detects B direction movement of the ball as ring 100 and the sensor rotate relative to bar section 91 and ring 42. Bar section 91 is integrally formed with ring 42.

According to the third embodiment of this invention, rings 42 and 100 along with bar 36 remain in the lower gravitational half of ball 20 (or at the equator thereof) due to the weight of battery compartment 34. Sensors 90, 92, and 94 detect rotational movement of ball 20 in their respective directions and forward such information to control unit 50 disposed inside of ball 20. Thereafter, control unit 50 forwards the coordinate indicating data to wireless transmitter 52 disposed within the ball, which in turn sends the coordinate data to a remotely located display system having an interface card 54.

Figure 12:
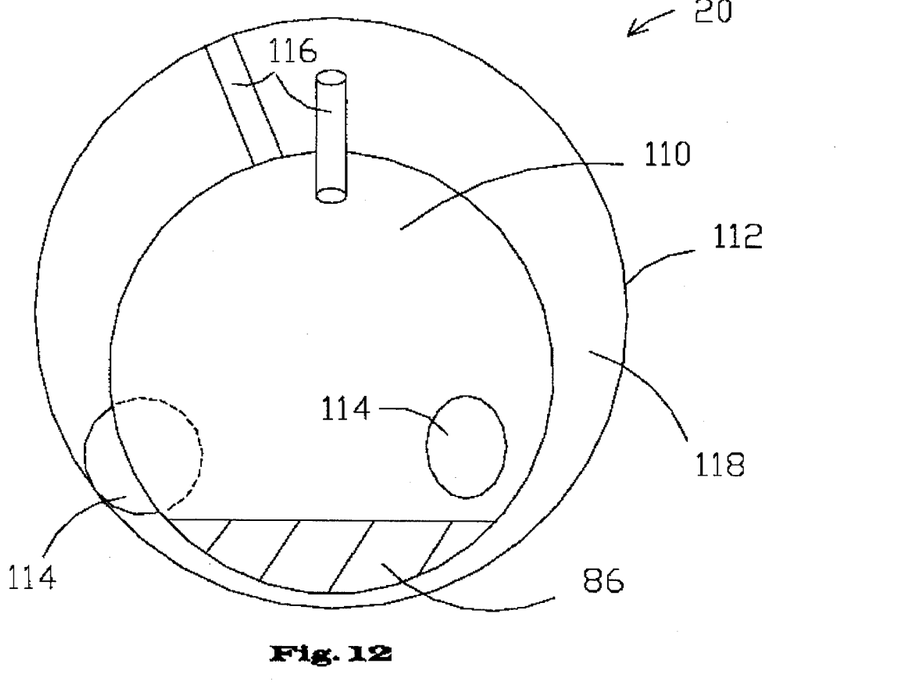
FIG. 12 is a perspective view partially in cross-section of a ball according to a fourth embodiment of this invention wherein both an inner ball and an outer ball are provided.

FIG. 12 is a perspective view in partial cross-section of ball 20 according to a fourth embodiment of this invention. Ball 20 of this embodiment includes inner ball 110, outer ball 112, rotatable sensor balls 114, and button members 116. Balls 114 mounted on inner ball 110 are connected to disc-shaped sensors which detect ball movement of the outer ball relative to the stationary inner ball. Balls 114 also function to maintain the position of the outer ball relative to the inner ball. Inner ball 110 includes weight 86 therein to keep it relatively stationary relative to outer ball 112 when ball 20 is rotated.

Outer ball 112 is flexible so that buttons 116 may be activated by a user pressing on a particular portion of outer ball 112. Sensors 74 and 76 (see second embodiment) may be disposed in gap 118 defined between inner ball 110 and outer ball 112 as in the second embodiment.

Once given the above disclosure many other features, modifications, and improvements will become apparent to the skilled artisan. Such other features, modifications, and improvements are therefore considered to be a part of this invention, the scope of which is to be determined by the following claims.

I claim:

1. A coordinate input apparatus for a display system where the display is alterable in accordance with signals delivered to the display from the coordinate input apparatus, the signals indicating coordinate positions on the display, the coordinate input apparatus comprising:

a housing;

a hollow ball rotatably mounted within said housing;

an inner structure disposed within said ball, said inner structure including a ring-shaped member rotatable relative to said ball in a predetermined direction;

a first sensor for detecting ball rotation in said predetermined direction, said first sensor being located inside of said ball; and a second sensor affixed to said ring-shaped member for detecting ball movement in the direction substantially perpendicular to said predetermined direction.

2. The apparatus according to claim 1, wherein a wireless transmitter is disposed within said ball for transmitting coordinate detected by said first and second sensors to a remotely located display system.

3. The apparatus according to claim 1, wherein said ring-shaped member is disposed at substantially the equator of said ball.

4. The apparatus according to claim 1, wherein said ball is composed of first and second detachably coupled structural halves.

5. The apparatus of claim 1, further comprising a battery compartment disposed within said ball and rigidly mounted on a shaft as to provide an equilibrium for said ball said second sensor being rotatable relative to said shaft and connected thereto so that said second sensor detects the amount of movement of said ring-shaped member relative to said shaft.

6. The apparatus according to claim 1, further including a third sensor disposed within said ball for indicating rotational movement of said ball in a third direction, wherein said first sensor is mounted to the interior periphery of said ball and said third sensor is affixed to a second ring-shaped member disposed within said ball, said third sensor detecting the amount of movement of said first ring-shaped member relative to said second ring-shaped member.

7. The apparatus of claim 1, wherein said coordinate input apparatus is a mouse device adapted to be moved over a substantially flat surface so as to rotate said ball and transmit coordinate indicating data to said display system.

8. The apparatus of claim 1, wherein said coordinate input apparatus is a trackball device adapted to have said ball rotated by a user in order to transmit coordinate indicating data to said display.

9. A coordinate indicating device including a rotatable ball mounted within a housing where rotation of said ball causes coordinate indicating data to be transmitted to a display, said rotatable ball comprising:

an inner ball and an outer ball, said inner ball located inside of said outer ball wherein said outer ball is rotatable relative to said inner ball so as to permit coordinate indicating data detected by a first sensor mounted inside of said outer ball to be transmitted to said display.

10. The device according to claim 9, further comprising a second sensor, said first and second sensors being disposed within a substantially annular space defined between said inner and outer balls, said first and second sensors for detecting the amount of rotation of said outer ball relative to said inner ball.

11. The device according to claim 10, wherein said inner ball includes a weight in said bottom portion thereof so as to keep said inner ball relatively stationary relative to said outer ball when said outer ball is rotated by the user.

12. The device according to claim 10, further including a plurality of ball bearing members for rotating supporting said inner and outer balls relative to one another.

* * * * *